United States Patent
Noh et al.

(10) Patent No.: US 10,633,467 B2
(45) Date of Patent: Apr. 28, 2020

(54) METHOD FOR PREPARING LONG FIBER-REINFORCING OLEFIN POLYMER AND LONG FIBER

(71) Applicant: LG Chem, Ltd., Seoul (KR)

(72) Inventors: Kyung Seop Noh, Daejeon (KR); Ki Soo Lee, Daejeon (KR); Sang Jin Jeon, Daejeon (KR); Sang Eun An, Daejeon (KR); Ji Ho Choi, Daejeon (KR); Jae Youp Cheong, Daejeon (KR); Hee Kwang Park, Daejeon (KR); Sang Hoon Lee, Daejeon (KR)

(73) Assignee: LG Chem, Ltd. (KR)

( * ) Notice: Subject to any disclaimer, the term of this patent is extended or adjusted under 35 U.S.C. 154(b) by 123 days.

(21) Appl. No.: 15/753,570

(22) PCT Filed: Nov. 30, 2016

(86) PCT No.: PCT/KR2016/013926
§ 371 (c)(1),
(2) Date: Feb. 20, 2018

(87) PCT Pub. No.: WO2017/111335
PCT Pub. Date: Jun. 29, 2017

(65) Prior Publication Data
US 2018/0237560 A1   Aug. 23, 2018

(30) Foreign Application Priority Data

Dec. 23, 2015 (KR) .................. 10-2015-0185311
Mar. 30, 2016 (KR) .................. 10-2016-0038235

(51) Int. Cl.
| | |
|---|---|
| C08F 10/06 | (2006.01) |
| C08K 7/02 | (2006.01) |
| C08F 110/06 | (2006.01) |
| C08K 7/14 | (2006.01) |
| C08J 5/04 | (2006.01) |
| C08K 7/06 | (2006.01) |
| C08F 4/659 | (2006.01) |

(52) U.S. Cl.
CPC ............ *C08F 10/06* (2013.01); *C08F 110/06* (2013.01); *C08J 5/04* (2013.01); *C08J 5/041* (2013.01); *C08J 5/042* (2013.01); *C08J 5/046* (2013.01); *C08K 7/02* (2013.01); *C08K 7/06* (2013.01); *C08K 7/14* (2013.01); *C08F 4/65908* (2013.01); *C08F 4/65912* (2013.01); *C08F 4/65916* (2013.01); *C08F 2420/02* (2013.01)

(58) Field of Classification Search
None
See application file for complete search history.

(56) References Cited

U.S. PATENT DOCUMENTS

| | | | |
|---|---|---|---|
| 5,786,291 A | 7/1998 | Speca et al. | |
| 5,854,362 A | 12/1998 | Nickias et al. | |
| 6,114,555 A | 9/2000 | Llinas et al. | |
| 6,207,600 B1 | 3/2001 | Nakajima et al. | |
| 6,506,919 B1 | 1/2003 | Oh et al. | |
| 9,884,926 B2 | 2/2018 | Park et al. | |
| 2008/0172840 A1 | 7/2008 | Kacker et al. | |
| 2011/0178229 A1* | 7/2011 | Goda ................... C08J 3/12 524/562 |
| 2014/0316085 A1 | 10/2014 | Stewart et al. | |
| 2016/0208028 A1 | 7/2016 | Choi et al. | |
| 2016/0251460 A1 | 9/2016 | Noh et al. | |
| 2016/0257703 A1 | 9/2016 | Park et al. | |
| 2016/0340451 A1 | 11/2016 | Park et al. | |

FOREIGN PATENT DOCUMENTS

| | | |
|---|---|---|
| EP | 2824107 A1 | 1/2015 |
| JP | H111189914 A | 7/1999 |
| JP | 2000007692 A | 1/2000 |
| JP | 2002003691 A | 1/2002 |
| JP | 2003278027 A | 10/2003 |
| JP | 4234199 B2 | 3/2009 |
| JP | 2010235774 A | 10/2010 |
| JP | 2013159884 A | 8/2013 |
| JP | 5525822 B2 | 6/2014 |
| KR | 19990082096 | 11/1999 |
| KR | 20000062706 A | 10/2000 |
| KR | 20140133343 A | 11/2014 |
| KR | 20150037652 A | 4/2015 |
| KR | 20150037653 A | 4/2015 |
| KR | 20150052803 A | 5/2015 |
| KR | 20150052804 A | 5/2015 |
| KR | 101653356 B1 | 9/2016 |
| KR | 101653357 B1 | 9/2016 |

OTHER PUBLICATIONS

Extended European Search Report including Written Opinion for Application No. EP16879202.6 dated Sep. 13, 2018.
International Search Report for Application No. PCT/KR2016/013926 dated Mar. 8, 2017.

* cited by examiner

*Primary Examiner* — Robert T Butcher
(74) *Attorney, Agent, or Firm* — Lerner, David, Littenberg, Krumholz & Mentlik, LLP

(57) ABSTRACT

The present invention provides a method for preparing an olefin polymer which can exhibit excellent isotacticity in a high yield and thus is suitable for use in reinforcing a long fiber, and a long fiber comprising an olefin polymer produced according to the above preparation method. In the preparation method, there can be provided an olefin polymer having excellent isotacticity in a high yield can be obtained by using a supported catalyst in which a transition metal compound having a specific structure is supported on a carrier together with two kinds of cocatalysts. In particular, the supported catalyst can exhibit high activity, excellent process stability and high hydrogen reactivity, thereby providing an olefin polymer having a high flow rate with a regular and excellent morphology. Such olefin polymer exhibits high processability while having excellent mechanical properties such as a tensile strength and a flexural strength, and thus are very useful as long fiber reinforced resins. They are used as long fiber reinforced resins and have an advantage in that total volatile organic compounds (TVOC) are significantly low as compared with those of general-purpose long fiber reinforced resins.

18 Claims, No Drawings

METHOD FOR PREPARING LONG FIBER-REINFORCING OLEFIN POLYMER AND LONG FIBER

CROSS-REFERENCE TO RELATED APPLICATIONS

The present application is a national phase entry under 35 U.S.C. § 371 of International Application No. PCT/KR2016/013926 filed Nov. 30, 2016, which claims priority from Korean Patent Application Nos. 10-2015-0185311 filed Dec. 23, 2015 and 10-2016-0038235 filed Mar. 30, 2016, all of which are incorporated herein by reference.

BACKGROUND OF THE INVENTION

(a) Field of the Invention

The present invention relates to a method for preparing a long fiber-reinforcing olefin polymer and to a long fiber comprising an olefin polymer produced by the above preparation method.

(b) Description of the Related Art

Polypropylene produced using a conventional Ziegler-Natta catalyst has excellent strength and stretchability and thus is used as a fiber for providing nonwoven fabric and the like. However, the Ziegler-Natta catalyst has limitations in producing polymers exhibiting a high flow rate due to its low hydrogen reactivity. Therefore, a polymer showing a high flow rate is prepared by supplying an excess amount of hydrogen, and it is mixed with a polymer exhibiting a low flow rate to compensate the processability, or a polymer exhibiting a low flow rate is cracked to compensate the processability. However, there is a problem in that mixing of polymers having mutually different flow rates or cracking of polymers having low flow rates lead to a decrease in the physical properties such as the strength and the processability of the fiber produced therefrom and to the generation of high total volatile organic compounds (TVOC).

DETAILED DESCRIPTION OF THE INVENTION

Technical Problem

It is an object of the present invention to provide a method for preparing an olefin polymer which can exhibit excellent isotacticity in a high yield and thus is suitable for use in reinforcing a long fiber.

It is another object of the present invention to provide a long fiber comprising an olefin polymer produced by the above preparation method.

According to one embodiment of the present invention, there is provided a method for preparing a long fiber-reinforcing olefin polymer, the method comprising the steps of: polymerizing olefin monomers in the presence of a supported catalyst in which a transition metal compound represented by the following Chemical Formula 1, a cocatalyst represented by the following Chemical Formula 2, and a cocatalyst represented by the following Chemical Formula 3 are supported on a carrier.

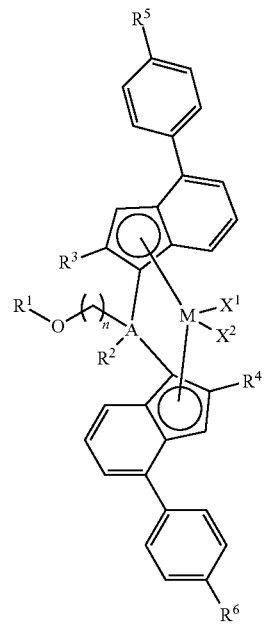

[Chemical Formula 1]

in Chemical Formula 1,

M is one of a Group 3 transition metal, a Group 4 transition metal, a Group 5 transition metal, a lanthanide series transition metal, and an actinide series transition metal, $X^1$ and $X^2$ are the same as or different from each other, and are each independently one of halogen, A is one of Group 14 elements, n is an integer between 1 and 20, $R_1$ is one of an alkyl having 1 to 20 carbon atoms, an alkenyl having 2 to 20 carbon atoms, an alkylaryl having 7 to 30 carbon atoms, an arylalkyl having 7 to 30 carbon atoms, and an aryl having 6 to 30 carbon atoms, $R_2$ is one of hydrogen, an alkyl having 1 to 20 carbon atoms, an alkenyl having 2 to 20 carbon atoms, an alkylaryl having 7 to 30 carbon atoms, an arylalkyl having 7 to 30 carbon atoms, and an aryl having 6 to 30 carbon atoms, and $R_3$ to $R_6$ are each independently one of an alkyl having 1 to 20 carbon atoms,

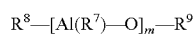

[Chemical Formula 2]

In Chemical Formula 2, $R^7$, $R^8$ and $R^9$ are each independently one of hydrogen, halogen, a hydrocarbyl group having 1 to 20 carbon atoms and a hydrocarbyl group having 1 to 20 carbon atoms substituted with halogen, and m is an integer of 2 or more,

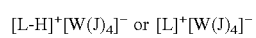

[Chemical Formula 3]

wherein, L is a neutral or cationic Lewis base,

W is a Group 13 element, J is each independently a hydrocarbyl group having 1 to 20 carbon atoms; a hydrocarbyloxy group having 1 to 20 carbon atoms; and substituents in which at least one hydrogen atom of the above substituent groups is substituted with at least one substituent selected from halogen, a hydrocarbyloxy group having 1 to 20 carbon atoms and a hydrocarbyl(oxy)silyl group having 1 to 20 carbon atoms.

The supported catalyst used herein may be a catalyst in which a cocatalyst of Chemical Formula 2, a transition metal compound of Chemical Formula 1, a cocatalyst of Chemical Formula 3 are sequentially supported on a carrier.

Meanwhile, the supported catalyst may include a transition metal compound in which $R^3$ and $R^4$ in Chemical Formula 1 are each independently one of a linear alkyl having 1 to 3 carbon atoms.

The supported catalyst may include a transition metal compound in which $R^5$ and $R^6$ in Chemical Formula 1 are each independently one of a branched alkyl having 3 to 6 carbon atoms.

The supported catalyst may include a transition metal compound in which $R^1$ in Chemical Formula 1 is one of a branched chain alkyl having 3 to 6 carbon atoms and n is an integer between 3 and 9.

The supported catalyst may include a transition metal compound in which $R^2$ in Chemical Formula 1 is one of a linear alkyl having 1 to 3 carbon atoms.

In the supported catalyst, M in Chemical Formula 1 may be one of Group 4 transition metals.

Meanwhile, silica, alumina, magnesia, or a mixture thereof may be used as the carrier.

The olefin monomer used in the preparation method according to one embodiment of the invention may include at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene.

Among them, propylene is used as the olefin monomer, thereby providing polypropylene having high degree of stereoregularity in high yield.

According to the preparation method of the above embodiment, an olefin polymer having a weight average molecular weight of 100,000 to 500,000 g/mol can be provided. In addition, according to the above preparation method, an olefin polymer having a degree of stereoregularity of 99% by weight or more can be provided.

Meanwhile, according to another embodiment of the invention, there is provided a long fiber comprising the olefin monomer prepared by the above preparation method.

The long fiber may further include, in addition to the above-mentioned olefin polymer, at least one reinforced fiber selected from the group consisting of an organic fiber, a natural fiber, a regenerated fiber, a semi-synthetic fiber, a synthetic fiber, a pitch-based carbon fiber, an aramid fiber and a boron fiber. These reinforced fibers may be contained in an amount of 5 to 50 parts by weight based on 100 parts by weight of the olefin polymer.

The long fibers have excellent tensile strength, flexural strength and impact strength. For example, the long fibers may have a tensile strength of 975 to 1,000 kgf/cm², a flexural strength of 1,320 to 1,400 kgf/cm², and an impact strength of 28.0 to 30 kgf*cm/cm.

In the preparation method according to one embodiment of the invention, there can be provided an olefin polymer having excellent isotacticity in a high yield can be obtained by using a supported catalyst in which a transition metal compound having a specific structure is supported on a carrier together with two kinds of cocatalysts. In particular, the supported catalyst can exhibit high activity, excellent process stability and high hydrogen reactivity, thereby providing an olefin polymer having a high flow rate with a regular and excellent morphology. Such olefin polymer exhibits high processability while having excellent mechanical properties such as a tensile strength and a flexural strength, and thus are very useful as long fiber reinforced resins. They are used as long fiber reinforced resins and have an advantage in that total volatile organic compounds (TVOC) are significantly low as compared with those of general-purpose long fiber reinforced resins.

DETAILED DESCRIPTION OF THE EMBODIMENTS

A method for preparing a long fiber reinforcing olefin polymer according to a specific embodiment of the invention and a long fiber comprising an olefin polymer provided through the above preparation method, etc., will be described in detail below.

According to one embodiment of the present invention, there is provided a method for preparing a long fiber-reinforcing olefin polymer, the method comprising the steps of: polymerizing olefin monomers in the presence of a supported catalyst in which a transition metal compound represented by the following Chemical Formula 1, a cocatalyst represented by the following Chemical Formula 2, and a cocatalyst represented by the following Chemical Formula 3 are supported on a carrier.

[Chemical Formula 1]

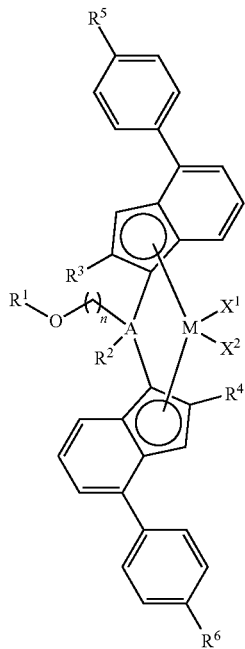

in Chemical Formula 1,

M is one of a Group 3 transition metal, a Group 4 transition metal, a Group 5 transition metal, a lanthanide series transition metal, and an actinide series transition metal, $X^1$ and $X^2$ are the same as or different from each other, and are each independently one of halogen, A is one of Group 14 elements, n is an integer between 1 and 20, $R_1$ is one of an alkyl having 1 to 20 carbon atoms, an alkenyl having 2 to 20 carbon atoms, an alkylaryl having 7 to 30 carbon atoms, an arylalkyl having 7 to 30 carbon atoms, and an aryl having 6 to 30 carbon atoms, $R_2$ is one of hydrogen, an alkyl having 1 to 20 carbon atoms, an alkenyl having 2 to 20 carbon atoms, an alkylaryl having 7 to 30 carbon atoms, an arylalkyl having 7 to 30 carbon atoms, and an aryl having 6 to 30 carbon atoms, and $R_3$ to $R_5$ are each independently one of an alkyl having 1 to 20 carbon atoms,

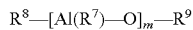   [Chemical Formula 2]

In Chemical Formula 2, $R^7$, $R^8$ and $R^9$ are each independently one of hydrogen, halogen, a hydrocarbyl group having 1 to 20 carbon atoms and a hydrocarbyl group having 1 to 20 carbon atoms substituted with halogen, and m is an integer of 2 or more,

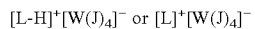   [Chemical Formula 3]

wherein, L is a neutral or cationic Lewis base,

W is a Group 13 element, J is each independently a hydrocarbyl group having 1 to 20 carbon atoms; a hydrocarbyloxy group having 1 to 20 carbon atoms; and substituents in which at least one hydrogen atom of the above substituent groups is substituted with at least one substituent selected from halogen, a hydrocarbyloxy group having 1 to 20 carbon atoms and a hydrocarbyl(oxy)silyl group having 1 to 20 carbon atoms.

Unless otherwise specified herein, the terms used herein can be defined as follows.

Halogen may be fluorine (F), chlorine (Cl), bromine (Br) or iodine (I).

The hydrocarbyl group is a monovalent functional group in which a hydrogen atom has been removed from a hydrocarbon, and may include an alkyl group, an alkenyl group, an alkynyl group, an aryl group, an aralkyl group, an aralkenyl group, an aralkynyl group, an alkylaryl group, an alkenylaryl group, an alkynylaryl group, and the like. And the hydrocarbyl group having 1 to 20 carbon atoms may be a hydrocarbyl group having 1 to 15 carbon atoms or 1 to 10 carbon atoms. Specific examples of the hydrocarbyl group having 1 to 20 carbon atoms include linear, branched or cyclic alkyl groups such as methyl group, ethyl group, n-propyl group, iso-propyl group, n-butyl group, isobutyl group, tert-butyl group, n-pentyl group, n-hexyl group, n-heptyl group, cyclohexyl group and the like; or aryl groups such as phenyl group, naphthyl group, or anthracenyl group.

The hydrocarbyloxy group is a functional group in which the hydrocarbyl group is bonded to oxygen. Specifically, the hydrocarbyloxy group having 1 to 20 carbon atoms may be a hydrocarbyloxy group having 1 to 15 carbon atoms or 1 to 10 carbon atoms. More specifically, the hydrocarbyloxy group having 1 to 20 carbon atoms is preferably linear, branched or cyclic alkoxy groups such as methoxy group, ethoxy group, n-propoxy group, iso-propoxy group, n-butoxy group, iso-butoxy group, tert-butoxy group, n-pentoxy group, n-hexoxy group, n-heptoxy group, cycloheptoxy group and the like; or aryloxy groups such as phenoxy group, naphthalenoxy group or the like.

The hydrocarbyl(oxy)silyl group is a functional group in which one to three hydrogens of —$SiH_3$ are substituted with one to three hydrocarbyl groups or hydrocarbyloxy groups. Specifically, the hydrocarbyl(oxy)silyl group having 1 to 20 carbon atoms may be a hydrocarbyl(oxy)silyl group having 1 to 15 carbon atoms, 1 to 10 carbon atoms, or 1 to 5 carbon atoms. More specifically, the hydrocarbyl(oxy)silyl group having 1 to 20 carbon atoms may be alkylsilyl groups such as methylsilyl group, dimethylsilyl group, trimethylsilyl group, a dimethylethylsilyl group, diethylmethylsilyl group and dimethylpropylsilyl group; alkoxysilyl groups such as methoxysilyl group, dimethoxysilyl group, trimethoxysilyl group, and dimethoxyethoxysilyl group; alkoxyalkylsilyl groups such as methoxydimethylsilyl group, diethoxymethylsilyl group and dimethoxypropylsilyl group, and the like.

The alkyl group having 1 to 20 carbon atoms may be a linear, branched or cyclic alkyl group. Specifically, the alkyl group having 1 to 20 carbon atoms may be a linear alkyl group having 1 to 20 carbon atoms; a linear alkyl group having 1 to 10 carbon atoms; a linear alkyl group having 1 to 5 carbon atoms; a branched or cyclic alkyl group having 3 to 20 carbon atoms; a branched or cyclic alkyl group having 3 to 15 carbon atoms; or a branched or cyclic alkyl group having 3 to 10 carbon atoms. More specifically, the alkyl group having 1 to 20 carbon atoms may be methyl group, ethyl group, n-propyl group, iso-propyl group, n-butyl group, iso-butyl group, tert-butyl group, n-pentyl group, iso-pentyl group, neo-pentyl group, cyclohexyl group, or the like.

The alkenyl group having 2 to 20 carbon atoms may be a linear, branched or cyclic alkenyl group. Specifically, the alkenyl group having 2 to 20 carbon atoms may be a linear alkenyl group having 2 to 20 carbon atoms, a linear alkenyl group having 2 to 10 carbon atoms, a linear alkenyl group having 2 to 5 carbon atoms, a branched alkenyl group having 3 to 20 carbon atoms, a branched alkenyl group having 3 to 15 carbon atoms, a branched alkenyl group having 3 to 10 carbon atoms, a cyclic alkenyl group having 5 to 20 carbon atoms, or a cyclic alkenyl group having 5 to 10 carbon atoms. More specifically, the alkenyl group having 2 to 20 carbon atoms may be ethenyl group, propenyl group, butenyl group, pentenyl group or cyclohexenyl group.

The aryl having from 6 to 30 carbon atoms may mean monocyclic, bicyclic or tricyclic aromatic hydrocarbon. Specifically, the aryl having 6 to 30 carbon atoms may be phenyl group, naphthyl group, anthracenyl group, or the like.

The alkylaryl having 7 to 30 carbon atoms may mean a substituent wherein at least one hydrogen of the aryl is substituted by alkyl. Specifically, the alkylaryl having 7 to 30 carbon atoms may be methylphenyl, ethylphenyl, n-propylphenyl, iso-propylphenyl, n-butylphenyl, iso-butylphenyl, tert-butylphenyl, cyclohexylphenyl, or the like.

The arylalkyl having 7 to 30 carbon atoms may mean a substituent wherein at least one hydrogen of the alkyl is substituted by aryl. Specifically, the arylalkyl having 7 to 30 carbon atoms may be benzyl group, phenylpropyl, phenylhexyl, or the like.

In the preparation method of one embodiment, an olefin polymer having excellent isotacticity with a high yield can be obtained by using a supported catalyst in which a transition metal compound having a structure of Chemical Formula 1, a cocatalyst of Chemical Formula 2, and a cocatalyst of Chemical Formula 3 are supported on a carrier. In particular, the supported catalyst is a Robust supported catalyst which exhibits high activity and thus excellent process stability, thereby providing an olefin polymer having regular and excellent morphology. In addition, the supported catalyst exhibits high hydrogen reactivity, and according to the production method of one embodiment, an olefin polymer having high flow rate can be provided. These olefin polymers are very useful as long fiber reinforced resins which exhibit high processability while having excellent mechanical properties such as a tensile strength and a flexural strength, and are very useful as long fiber reinforced resins. They are used as long fiber reinforced resins and have an advantage in that total volatile organic compounds (TVOC) are significantly low as compared with those of general-purpose long fiber reinforced resin.

The supported catalyst used herein may be formed by sequentially supporting a cocatalyst of Chemical Formula 2, a transition metal compound of Chemical Formula 1 and a cocatalyst of Chemical Formula 3 on a carrier.

The transition metal compound of Chemical Formula 1 may include one or more transition metal compounds represented by Chemical Formula 1 above.

More specifically, the transition metal compound of Chemical Formula 1 may be a transition metal compound in which $R^3$ and $R^4$ in Chemical Formula 1 are each independently one of linear alkyl having 1 to 3 carbon atoms; or a transition metal compound in which $R^5$ and $R^6$ in Chemical Formula 1 are each independently one of branched alkyl having 3 to 6 carbon atoms; or a transition metal compound in which $R^3$ and $R^4$ in Chemical Formula 1 are each independently one of linear alkyl having 1 to 3 carbon atoms, and $R^5$ and $R^6$ are each independently one of branched alkyl having 3 to 6 carbon atoms. The transition metal compound having such a structure can cause an appropriate steric hindrance to more effectively ensure the above-mentioned effects.

The bridge group connecting an indenyl ligand in the transition metal compound of Chemical Formula 1 may affect the supporting stability of a transition metal compound. For example, when $R_1$ is one of alkyl having 1 to 20 carbon atoms or one of branched alkyl having 3 to 6 carbon atoms and n is an integer between 3 and 9, the supporting efficiency for bulk polymerization can be increased. Further, when $R_2$ is one of hydrogen and alkyl having 1 to 20 carbon atoms, or linear alkyl having 1 to 3 carbon atoms, and A is C or Si, more excellent supporting stability can be secured. In addition, the above-mentioned bridge group can form a chemical bond with the cocatalyst supported on a carrier to effectively prevent the fouling phenomenon in the reactor during the polymerization of the olefin monomer.

In addition, as one of Group 4 transition metals; or one of Ti, Zr and Hf is used as M in Chemical Formula 1, the storage stability of the metal complex can be improved.

The transition metal compound represented by Chemical Formula 1 can be synthesized by applying known reactions. For a more detailed synthesis method, refer to Preparation Examples 1 and 2 described later.

Meanwhile, as the cocatalysts of Chemical Formulas 2 and 3, all of various cocatalysts represented by Chemical Formulas 2 and 3 may be used. For example, as the cocatalyst of Chemical Formula 2, methyl aluminoxane, ethyl aluminoxane, isobutyl aluminoxane, tert-butyl aluminoxane, or a mixture thereof may be used. As the cocatalyst of Chemical Formula 3, trimethylammonium tetrakis(pentafluorophenyl)borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, dimethylanilinium tetrakis(4-(triisopropylsilyl)-2,3,5,6-tetrafluorophenyl)borate, N,N-dimethylanilinium pentafluorophenoxy tris(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, N,N-dimethylanilinium tetrakis(2,3,4,6-tetrafluorophenyl)borate, hexadecyldimethylammonium tetrakis(pentafluorophenyl)borate, N-methyl-dodecylanilinium tetrakis (pentafluorophenyl) borate, methyldi(dodecyl) ammonium tetrakis(pentafluorophenyl)borate, or a mixture thereof can be used.

The amount of the cocatalyst to be used can be appropriately adjusted depending on the physical properties and effects of the desired supported catalyst and olefin polymer.

Meanwhile, a carrier containing a hydroxy group or a siloxane group on its surface can be used as the carrier. Specifically, a carrier containing a hydroxy group or a siloxane group having high reactivity can be used as the carrier by drying at high temperature to remove moisture on the surface. More specifically, examples of the carrier include silica, alumina, magnesia, and mixtures thereof. The carrier may be those which has been dried at high temperatures and these may typically include oxides, carbonates, sulphates and nitrate components such as $Na_2O$, $K_2CO_3$, $BaSO_4$ and $Mg(NO_3)_2$.

Examples of the olefin monomers that can be polymerized with the supported catalyst in the preparation method according to one embodiment include ethylene, alpha-olefins, cyclic olefins, etc., and diene olefin monomers or triene olefin monomers having two or more double bonds, and the like can also be polymerized. Specific examples of the monomers include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, and the like. Two or more of these monomers can be mixed and copolymerized.

In particular, in the preparation method according to one embodiment, propylene can be polymerized in the presence of the supported catalyst to provide a long fiber reinforced resin exhibiting excellent mechanical properties and processability as compared with other olefin polymers.

In the preparation method according to one embodiment, various polymerization steps known as a polymerization reaction of olefin monomers such as a continuous solution polymerization step, a bulk polymerization step, a suspension polymerization step, a slurry polymerization step, an emulsion polymerization step or the like can be employed.

Specifically, the polymerization reaction may be carried out at a temperature of about 40 to 110° C. or about 60 to 100 t and a pressure of about 1 to 100 kgf/cm².

In the polymerization reaction, the supported catalyst may be used in a state of being dissolved or diluted in a solvent such as pentane, hexane, heptane, nonane, decane, toluene, benzene, dichloromethane, chlorobenzene and the like. At this time, by treating the solvent with a small amount of alkylaluminum or the like, a small amount of water or air that can adversely affect the catalyst can be removed in advance.

The olefin polymer produced by the preparation method according to this embodiment has a low molecular weight and a broad molecular weight distribution, and thus can exhibit excellent processability. As an example, the olefin polymer produced by the above preparation method may have a weight average molecular weight of 100,000 to 500,000 g/mol.

In addition, the olefin polymer produced by the preparation method according to one embodiment may exhibit a high degree of stereoregularity. For example, the above preparation method can provide an olefin polymer having a degree of stereospecificity of 99% by weight or more as measured by the method described in Test Examples to be described later.

Meanwhile, according to another embodiment of the invention, there is provided a long fiber comprising an olefin polymer produced according to the above preparation method.

The olefin polymer has been previously described in detail, and so detailed description thereof is omitted here.

The long fiber may further include, in addition to the above-mentioned olefin polymer, at least one reinforced fiber selected from the group consisting of an organic fiber, a natural fiber, a regenerated fiber, a semi-synthetic fiber, a synthetic fiber, a pitch-based carbon fiber, an aramid fiber and a boron fiber, in order to enhance various physical properties thereof. The amount of the reinforced fiber to be added may be appropriately adjusted depending on the use of the long fibers, and may be adjusted to about 5 to 50 parts by weight based on 100 parts by weight of the olefin polymer.

The long fibers according to another embodiment may exhibit remarkably improved mechanical strength as compared with long fibers comprising an olefin polymer produced through a conventional Ziegler-Natta catalyst or a metallocene catalyst. For example, the long fibers may have a tensile strength of 975 to 1,000 kgf/cm$^2$, a flexural strength of 1,320 to 1,400 kgf/cm$^2$, and an impact strength of 28.0 to 30 kgf*cm/cm. The physical property value is a physical property value when the olefin polymer and the glass fiber are mixed at a weight ratio of 80:20. For detailed strength measuring method, refer to the method described in Test Examples described later.

The action and effects of the invention will be described more concretely through examples of the invention below. However, these examples are provided for illustrative purposes only, and are not intended to limit the scope of the invention in any way.

Preparation Example 1: Preparation of Transition Metal Compound and Supported Catalyst

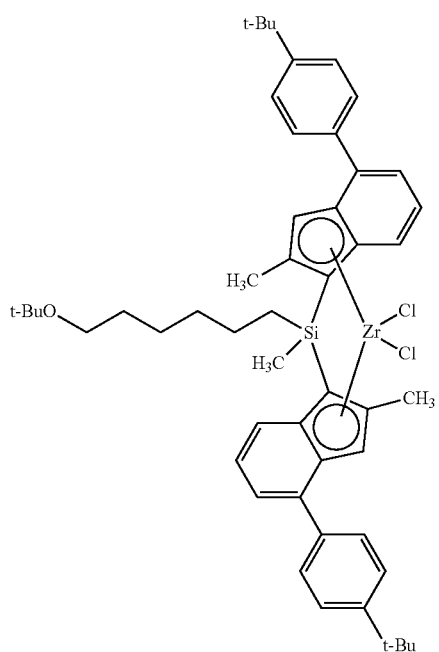

Step 1: Preparation of bis(2-methyl-4-(tert-butyl-phenyl)indenyl)(6-t-butoxyhexyl)(methyl)silane 2-Methyl-4-tert-butylphenylindene (20.0 g, 76 mmol) was dissolved in toluene/THF=10/1 solution (230 mL), and then n-butyllithium solution (2.5 M, hexane solvent, 22 g) was slowly dropwise thereto at 0° C. Then, the mixed solution thus obtained was stirred at room temperature for one day. Then, (6-t-butoxyhexyl)dichloromethylsilane (1.27 g) was slowly added dropwise to the mixed solution at −78° C., stirred for about 10 minutes, and then stirred at room temperature for one day. Subsequently, water was added to separate the organic layer, and the solvent was distilled off under reduced pressure to obtain bis(2-methyl-4-(tert-butyl-phenyl)indenyl)(6-t-butoxyhexyl)(methyl)silane.

$^1$H NMR (500 MHz, CDCl$_3$, 7.26 ppm): −0.20-0.03 (3H, m), 1.26 (9H, s), 0.50-1.20 (4H, m), 1.20-1.31 (11H, m), 1.40-1.62 (20H, m), 2.19-2.23 (6H, m), 3.30-3.34 (2H, m), 3.73-3.83 (2H, m), 6.89-6.91 (2H, m), 7.19-7.61 (14H, m).

Step 2: Preparation of [(6-t-butoxyhexylmethylsilanediyl)-bis(2-methyl-4-tert-butylphenylindenyl)] zirconium dichloride After (6-t-butoxyhexyl)(methyl)-bis(2-methyl-4-(tert-butylphenyl)indenyl)silane prepared in the step 1 was dissolved in toluene/THF=5/1 solution (95 mL), n-butyllithium solution (2.5 M, hexane solvent, 22 g) was slowly dropwise thereto at −78° C., and then the obtained mixed solution was stirred at room temperature for one day. Then, bis(N,N'-diphenyl-1,3-propanediamido)dichlorozirconium bis (tetrahydrofuran) [Zr(C$_5$H$_6$NCH$_2$CH$_2$CH$_2$NC$_5$H$_6$)$_2$Cl$_2$(C$_4$H$_8$O)$_2$] was dissolved in toluene (229 mL) and slowly added dropwise to the reaction solution at −78° C., and then stirred at room temperature for one day. After the reaction solution was cooled to −78° C., a HCl ether solution (1 M, 183 mL) was slowly added dropwise, and then the mixture was stirred at 0° C. for 1 hour. After filtration and vacuum drying, hexane was added thereto and stirred to precipitate crystals. The precipitated crystals were filtered off and dried under reduced pressure to obtain [(6-t-butoxyhexylmethylsilanediyl)-bis(2-methyl-4-tert-butylphenylindenyl)]zirconium dichloride (20.5 g, yield 61%).

$^1$H NMR (500 MHz, CDCl$_3$, 7.26 ppm): 1.20 (9H, s), 1.27 (3H, s), 1.34 (18H, s), 1.20-1.90 (10H, m), 2.25 (3H, s), 2.26 (3H, s), 3.38 (2H, t), 7.00 (2H, s), 7.09-7.13 (2H, m), 7.38 (2H, d), 7.45 (4H, d), 7.58 (4H, d), 7.59 (2H, d), 7.65 (2H, d)

Step 3: Preparation of Supported Catalyst 52 mmol of methylaluminoxane (MAO) was added to a Schlenk flask containing 3 g of silica and reacted at 90° C. for 24 hours. When the reaction product was settled down after the completion of the reaction, the upper layer solution was removed and the remaining precipitate was washed twice with toluene. Then, 240 umol of [(6-t-butoxyhexylmethylsilanediyl)-bis(2-methyl-4-tert-butylphenylindenyl)] zirconium dichloride prepared above was dissolved in toluene and added to the flask, and reacted at 70° C. for 5 hours. Then, 48 umol of N,N-dimethylanilinium tetrakis(pentafluorophenyl)borate was added to the flask, and the mixture was reacted at 70° C. for 5 hours. When the reaction product was settled down after the completion of the reaction, the upper layer solution was removed, and the remaining precipitate was washed with toluene, washed again with hexane and then vacuum dried to obtain a silica-supported metallocene catalyst in the form of solid particles.

Preparation Example 2: Preparation of Transition Metal Compound and Supported Catalyst

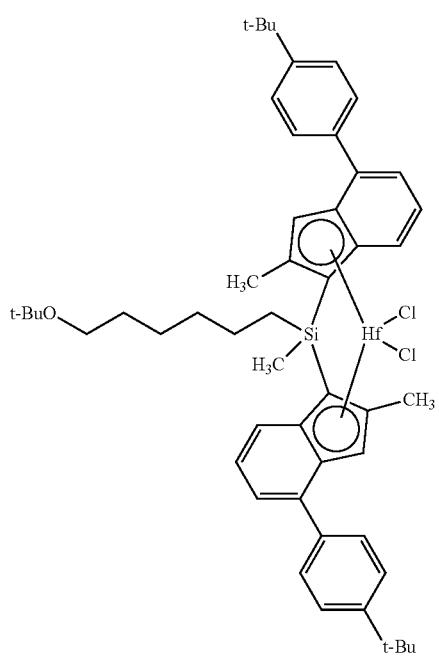

Step 1: Preparation of bis(2-methyl-4-(tert-butyl-phenyl)indenyl)(6-t-butoxyhexyl)(methyl)silane 2-Methyl-4-tert-butylphenylindene (20.0 g, 76 mmol) was dissolved in toluene/THF=10/1 solution (230 mL), and then n-butyllithium solution (2.5 M, hexane solvent, 22 g) was slowly dropwise thereto at 0° C. Then, the obtained mixed solution was stirred at room temperature for one day. Then, (6-t-butoxyhexyl)dichloromethylsilane (1.27 g) was slowly added dropwise to the mixed solution at −78° C., stirred for about 10 minutes, and then stirred at room temperature for one day. Subsequently, water was added to separate the organic layer, and the solvent was distilled off under reduced pressure to obtain bis(2-methyl-4-(tert-butyl-phenyl)indenyl)(6-t-butoxyhexyl)(methyl)silane.
$^1$H NMR (500 MHz, CDCl$_3$, 7.26 ppm): −0.20-0.03 (3H, m), 1.26 (9H, s), 0.50-1.20 (4H, m), 1.20-1.31 (11H, m), 1.40-1.62 (20H, m), 2.19-2.23 (6H, m), 3.30-3.34 (2H, m), 3.73-3.83 (2H, m), 6.89-6.91 (2H, m), 7.19-7.61 (14H, m).

Step 2: Preparation of [(6-t-butoxyhexylmethylsi-lanediyl)-bis(2-methyl-4-tert-butylphenylindenyl)]hafnium dichloride (6-t-butoxyhexyl)(methyl)-bis(2-methyl-4-tert-butylphe-nylindenyl)silane prepared previously was added to a 3 L Schlenk flask, and 1 L of diethyl ether was added thereto and dissolved at room temperature. After the solution was cooled to −20° C., 240 mL of n-butyllithium solution (2.5 M in hexane) was slowly added dropwise and the mixture was stirred at room temperature for 3 hours. Subsequently, the reaction solution was cooled to −78° C., and then 92 g of hafnium chloride was added thereto. The reaction solution was warmed to room temperature, stirred for 12 hours, and then the solvent was removed under reduced pressure. Subsequently, 1 L of dichloromethane was added to the reaction product, and an insoluble inorganic salt or the like was removed by filtration. The filtrate was dried under reduced pressure, and again 300 mL of dichloromethane was added to precipitate crystals. The precipitated crystals were filtered and dried to obtain 80 g of rac-[(6-t-butoxyhexylm-ethylsilanediyl)-bis(2-methyl-4-(4-tert-butylphenyl)inde-nyl)]hafnium dichloride (Rac: meso=50:1).
$^1$H NMR (500 MHz, CDCl$_3$, 7.26 ppm): 1.19-1.78 (37H, m), 2.33 (3H, s), 2.34 (3H, s), 3.37 (2H, t), 6.91 (2H, s), 7.05-7.71 (14H, m).

Step 3: Preparation of Supported Catalyst 52 mmol of methylaluminoxane (MAO) was put in a Schlenk flask containing 3 g of silica and reacted at 90° C. for 24 hours. When the reaction product was settled down after the completion of the reaction, the upper layer solution was removed, the upper layer solution was removed and the remaining precipitate was washed twice with toluene. Then, 240 umol of [(6-t-butoxyhexylmethylsilanediyl)-bis(2-methyl-4-tert-butylphenylindenyl)]hafnium dichloride pre-pared above was dissolved in toluene and added to the flask, and reacted at 70° C. for 5 hours. Then, 48 umol of N,N-dimethylanilinium tetrakis(pentafluorophenyl)borate was added to the flask, and the mixture was reacted at 70° C. for 5 hours. When the reaction product was settled down after the completion of the reaction, the upper layer solution was removed, and the remaining precipitate was washed with toluene, washed again with hexane and then vacuum dried to obtain a silica-supported metallocene catalyst in the form of solid particles.

Preparation Example 3: Preparation of Transition Metal Compound and Supported Catalyst

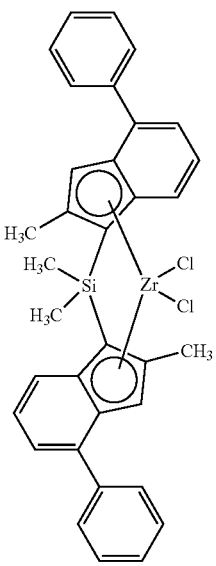

Step 1: Preparation of dimethyl bis(2-methyl-4-phenylindenyl)silane 49.5 mmol of 2-methyl-4-phenylindene was dissolved in toluene/THF=10/1 solution (77 mL), and then 21.8 mL of n-butyllithium solution (2.5 M, hexane solvent) was slowly added thereto at 0° C. Then, the obtained mixed solution was stirred at room temperature for one day. Then, 2.98 mL of dichloromethylsilane was slowly added dropwise to the mixed solution at 0° C. or lower, stirred for about 10 minutes, and then heated to 80° C. and stirred for 1 hour. Water was then added to separate the organic layer, purified through a silica column, and vacuum dried to give a sticky yellow oil in a yield of 61% (racemic: meso=1:1).

$^1$H NMR (500 MHz, CDCl$_3$, 7.24 ppm): 0.02 (6H, s), 2.37 (6H, s), 4.00 (2H, s), 6.87 (2H, t), 7.38 (2H, t), 7.45 (2H, t), 7.57 (4H, d), 7.65 (4H, t), 7.75 (4H, d).

Step 2: Preparation of [dimethylsilanediylbis(2-methyl-4-phenylindenyl)]zirconium dichloride After 12.4 mmol of dimethyl bis(2-methyl-4-phenylindenyl)silane prepared in the step 1 was dissolved in an ether/hexane=1/1 solution (240 mL), an n-butyllithium solution (2.5 M in hexane) was slowly added dropwise at −78° C., and then the mixture was stirred at room temperature for one day. Bis(N,N'-diphenyl-1,3-propanediamido)dichlorozirconium bis (tetrahydrofuran) Zr(C$_5$H$_6$NCH$_2$CH$_2$CH$_2$NC$_5$H$_6$)$_2$Cl$_2$(C$_4$H$_8$O)$_2$] was dissolved in toluene (229 mL), and then slowly added dropwise to the reaction solution, and the mixture was stirred at room temperature for one day. After the completion of the reaction, the red reaction product was filtered, dried under vacuum, and then toluene/ether=1/2 solution was added to obtain a clear red solution. HCl ether solution (1 M, 1.5 to 2 equivalents) was slowly added dropwise thereto at −78° C., and then stirred at room temperature for 3 hours. It was then filtered and vacuum dried to obtain [dimethylsilanediylbis(2-methyl-4-phenylindenyl)]zirconium dichloride as an orange solid in yield of 70% (racemic only).

$^1$H NMR (500 MHz, C$_6$D$_6$, 7.24 ppm): 1.32 (6H, s), 2.24 (6H, s), 6.93 (2H, s), 7.10 (2H, t), 7.32 (2H, t), 7.36 (2H, d), 7.43 (4H, t), 7.60 (4H, d), 7.64 (2H, d).

Step 3: Preparation of Supported Catalyst 52 mmol of methylaluminoxane (MAO) was put in a Schlenk flask containing 3 g of silica and reacted at 90° C. for 24 hours. When the reaction product was settled down after the completion of the reaction, the upper layer solution was removed and the remaining precipitate was washed twice with toluene. Then, 240 umol of [dimethylsilanediylbis(2-methyl-4-phenylindenyl)]zirconium dichloride prepared above was dissolved in toluene and added to the flask, and reacted at 70° C. for 5 hours. When the reaction product was settled down after the completion of the reaction, the upper layer solution was removed, and the remaining precipitate was washed with toluene, washed again with hexane and then vacuum dried to obtain a silica-supported metallocene catalyst in the form of solid particles.

Example 1: Polymerization of Olefin Monomers

A 2 L stainless steel reactor was vacuum dried at 65° C. and then cooled, to which 1.5 mmol of triethylaluminium was added at room temperature, and 770 g of propylene was added thereto. After the mixture was stirred for 10 minutes, the supported catalyst prepared in Preparation Example 1 was dissolved in TMA-formulated hexane and added to the reactor under nitrogen pressure. At this time, about 331 ppm of hydrogen gas was added together with the catalyst. Subsequently, After the reactor temperature was gradually raised to 70° C., polymerization was carried out for 1 hour. After the completion of the reaction, the unreacted propylene was vented.

Example 2: Polymerization of Olefin Monomers

Polypropylene was prepared in the same manner as in Example 1, except that the supported catalyst of Preparation Example 2 was used in Example 1.

Comparative Example 1: Polymerization of Olefin Monomers

Polypropylene was prepared in the same manner as in Example 1, except that the supported catalyst of Preparation Example 3 was used in Example 1.

Test Example 1 Evaluation of Physical Properties of Olefin Polymer

The activities of the catalysts used in Examples 1 and 2 and Comparative Example 1 and the physical properties of the olefin polymers prepared using the catalysts were evaluated, and the results are shown in Table 1 below.

Specifically, the activities of the catalysts used in Examples and Comparative Examples were calculated by measuring the mass of the catalyst used in the polymerization reaction and the mass of the polymer calculated per hour from the reaction, and the results are shown in Table 1 below.

The melting temperature (Tm) and the crystallization temperature (Tc) of the olefin polymer were measured using a differential scanning calorimeter (DSC, device name: DSC 2920, manufacturer: TA Instrument). Specifically, the olefin polymer was heated to 220° C., and maintained at that temperature for 5 minutes, cooled up to 20° C., and then heated up to 220° C. to determine Tm and Tc. At this time, the rising rate and falling rate of the temperature were controlled at 10° C./min, respectively.

The degree of stereoregularity of the olefin polymer was confirmed by weight ratio (wt %) of the polymer not dissolved in o-xylene with respect to the whole polymer after putting the polymer in o-xylene and subjecting to refluxing for 1 hour.

Specifically, 200 mL (Vb0, mL) of o-xylene was filtered with a 200 mm No. 4 extraction paper. The aluminum pan was dried in an oven at 150° C. for 30 minutes, then cooled in a desiccator, and the weight (W1, g) of the aluminum pan was measured. Next, 100 mL of filtered o-xylene (Vb2; mL) was collected by a pipette, and transferred to an aluminum pan, and heated to 145 to 150° C. to evaporate all o-xylene. Subsequently, the aluminum pan was vacuum-dried at a temperature of 100±5° C. and a pressure of 13.3 kPa for 1 hour. After the aluminum pan was cooled in a desiccator, the above procedure was repeated twice to thereby evaporate o-xylene within a weight error of 0.0002 g, and then the weight (W2, g) of the aluminum pan in which the residual material was remained was measured to complete a blank test.

Next, the prepared polymer was vacuum-dried (70° C., 13.3 kPa, 60 minutes), and then cooled in a desiccator. Then, a polymer sample (2 g±0.0001 g, (W0, g)) was placed in a 500 mL flask, and 200 mL of o-xylene (Vb0, mL) was added thereto. A condenser was connected to the flask and a cooling water was supplied to the condenser. Nitrogen was supplied to the flask through the condenser. Then, the solution contained in the flask was refluxed for 1 hour. Subsequently, the flask was placed in the air for 5 minutes and cooled to 100° C. or lower, and the flask was shaken and placed in a thermostatic chamber (25±0.5° C.) for 30 minutes to precipitate insoluble materials.

The solution obtained from precipitation of insoluble materials was repeatedly filtered using 200 mm No. 4 extraction paper to obtain a clear filtrate. Meanwhile, the aluminum pan was dried in an oven at 150° C. for 30 minutes, cooled in a desiccator, and the weight (W1, g) of the aluminum pan was measured. 100 ml (Vb1, mL) of the clear filtrate was added to the aluminum pan, and heated at 145 to 150° C. to evaporate o-xylene. Subsequently, the procedures of vacuum-drying the aluminum pan at a temperature of 70±5° C. and a pressure of 13.3 kPa for one hour and cooling in a desiccator were repeated twice to evaporate o-xylene within a weight error of 0.0002 g or less, and then the weight (W2, g) of the aluminum pan in which the residual polymer was remained was measured.

The weight ratio ($X_S$, wt %) of the part dissolved in o-xylene in the polymer was calculated according to the following Calculation Equation 1, and the weight ratio ($X_S$, weight %) of the polymer not dissolved in o-xylene was determined by substituting $X_S$ in the following Calculation Equation 2. Then, the weight ratio of the polymer not dissolved in o-xylene was defined as a degree of stereoregularity. That is, this means that the higher the weight ratio of the polymer not dissolved in o-xylene, the higher the degree of stereoregularity.

$$Xs = \left(\frac{Vbo}{Vb1} \times (W2 - W1) - \frac{Vbo}{Vb2} \times B\right) / Wo \times 100 \quad \text{[Calculation Equation 1]}$$

in the above equation 1, each variable means the following.

$X_S$=weight ratio (wt %) of the portion dissolved in o-xylene in the polymer
Vb0=initial o-xylene volume (mL)
Vb1=volume (mL) loaded on aluminum pan in o-xylene solution in which polymer is dissolved
Vb2=volume (mL) of o-xylene loaded on aluminum pan in blank test
W2=sum of polymer weights (g) remaining in an aluminum pan and an aluminum pan after evaporation of o-xylene
W1=weight (g) of aluminum pan
W0=initial polymer weight (g)
B=average weight of o-xylene residue left in aluminum pan (W3-W1, g)

$$Xl = 100 - X_S \quad \text{[Calculation Equation 2]}$$

Finally, the weight average molecular weight (Mw) and the number average molecular weight (Mn) of the olefin polymer were measured using gel permeation chromatography (GPO), and the molecular weight distribution (PDI, polydispersity index) was calculated by dividing the weight average molecular weight by the number average molecular weight. At this time, the analysis temperature was set to 160° C., trichlorobenzene was used as a solvent, and the molecular weight was measured by standardizing with polystyrene.

The results of the physical properties measured by the above-described method are shown in Table 1 below.

TABLE 1

|  | Example 1 | Example 2 | Comparative Example 1 |
| --- | --- | --- | --- |
| Polymerization temperature [° C.] | 70 | 70 | 70 |
| Hydrogen [ppm] | 331 | 331 | 331 |
| Catalyst Activity [kg Pol./g cat. * hr] | 10.1 | 9.1 | 7.6 |
| Tm [° C.] | 149.9 | 152.0 | 150.7 |
| Tc [° C.] | 100.7 | 103.1 | 102.1 |
| Xs [wt %] | 0.70 | 0.74 | 0.61 |
| Xl [wt %] | 99.30 | 99.26 | 99.39 |
| Mw | 289,000 | 280,000 | 608,000 |
| PDI | 2.7 | 2.9 | 2.6 |

Referring to Table 1, it was confirmed that the catalysts synthesized in Preparation Examples 1 and 2 exhibited excellent activity as compared with the catalysts prepared in Preparation Example 3.

And, in Examples 1 and 2 using the catalysts of Preparation Examples 1 and 2, it was confirmed that the olefin polymer showed excellent isotacticity compared to Comparative Example 1, and had a low molecular weight and a broad molecular weight distribution, thereby improving processability.

Test Example 2: Evaluation of Suitability for Long Fiber Reinforced Thermoplastic (LFRT)

In order to confirm whether the olefin polymers prepared in Examples 1 and 2 and Comparative Example 1 were suitable for use in LFRT, the physical properties of the olefin polymers prepared according to Examples 1 and 2 and Comparative Example 1 were compared with the physical properties of polypropylene prepared by the conventional Ziegler-Natta catalyst.

The olefin polymers prepared in Examples 1 and 2 and Comparative Example 1 had a melt flow rate (MFR) of 150 g/10 min as measured at a temperature of 230° C. under a load of 2.16 kg according to ISO 1133.

Meanwhile, as the polypropylene prepared by a commercially available Ziegler-Natty catalyst, polypropylenes having an MFR of 34 g/10 min, 40 g/10 min, 60 g/10 min, 1100 g/10 min and 1400 g/10 min as measured at a temperature of 230° C. under a load of 2.16 kg according to ISO 1133 were prepared. Then, polypropylene having an MFR of 60 g/10 min and polypropylene having an MFR of 1100 g/10 min were mixed at a weight ratio of 3:1 to prepare a polymer of Comparative Example 2 (hereinafter, referred to as ZN60+1100). Polypropylene having an MFR of 40 g/10 min and polypropylene having an MFR of 1100 g/10 min were mixed at a weight ratio of 3:1 to prepare a polymer of Comparative Example 3 (hereinafter, referred to as ZN40+ 1100). Polypropylene having an MFR of 34 g/10 min and polypropylene having an MFR of 1400 g/10 min were mixed at a weight ratio of 3:1 to prepare a polymer of Comparative Example 4 (hereinafter, referred to as ZN34+1400).

Next, the respective polymers prepared in Examples 1 to 2 and Comparative Examples 1 to 4 and glass fibers were supplied into a twin-screw extruder at a weight ratio of 80:20, melted and kneaded at a temperature of 220° C. to prepare pellets, Specimens for the measurement of physical properties using an injection machine were prepared.

The physical properties of the specimens were evaluated by the methods described below, and the results are shown in Table 2 below.

(1) Measurement of Tensile Strength

The tensile strength of the specimen was measured according to ASTM D638 using a Universal Testing Machine (UTM).

(2) Measurement of Flexural Strength and Flexural Modulus

The flexural strength and flexural modulus of the specimen were measured according to ASTM D790 (1997) using a Universal Testing Machine(UTM). In accordance with ASTM D790 (1997), a supports span was set to 100 mm using a three-point bending test jig (indenter 10 mm, point 10 mm). The flexural strength and flexural modulus were tested at a crosshead speed of 5.3 mm/min. The specimens were allowed to stand for 24 hours in a constant temperature and humidity chamber adjusted to a temperature of 23° C. and a relative humidity of 50%, and then subjected to the physical property evaluation test.

(3) Measurement of Notch Type Impact Strength

The Notch type impact strength was measured in accordance with ASTM D256 (1993) for the specimen.

TABLE 2

| | Comparative Example 1 | Comparative Example 2 | Comparative Example 3 | Comparative Example 4 | Example 1 | Example 2 |
|---|---|---|---|---|---|---|
| Tensile strength [kgf/cm$^2$] | 970 | 910 | 967 | 969 | 984 | 980 |
| Flexural strength [kgf/cm$^2$] | 1,310 | 1,247 | 1,288 | 1,303 | 1,356 | 1,340 |
| Flexural modulus [kgf/cm$^2$] | 47,134 | 50,732 | 46,432 | 45,974 | 48,041 | 47,890 |
| Impact strength [kgf*cm/cm] | 27.5 | 23.9 | 26.2 | 27.8 | 28.9 | 28.6 |
| Notch type impact strength [kgf*cm/cm] | 16.3 | 13.2 | 16.6 | 16.4 | 16.3 | 16.3 |

Referring to Table 2 above, it can be seen that the use of the supported catalyst according to one embodiment of the present invention can provide excellent strength and stretchability (notch type impact strength, flexural modulus, etc.) in equivalent level to the polymers prepared through conventional Ziegler-Natta catalysts (polymers of Comparative Examples 2 to 4). In particular, it is confirmed that the supported catalyst according to one embodiment of the present invention exhibits superior tensile strength, flexural strength and impact strength even when compared with the polymer (polymer of Comparative Example 1) produced through other metallocene catalysts.

What is claimed is:

1. A method for preparing a long fiber-reinforcing olefin polymer, the method comprising the steps of: polymerizing olefin monomers in the presence of a supported catalyst in which a transition metal compound represented by the following Chemical Formula 1, a cocatalyst represented by the following Chemical Formula 2, and a cocatalyst represented by the following Chemical Formula 3 are supported on a carrier

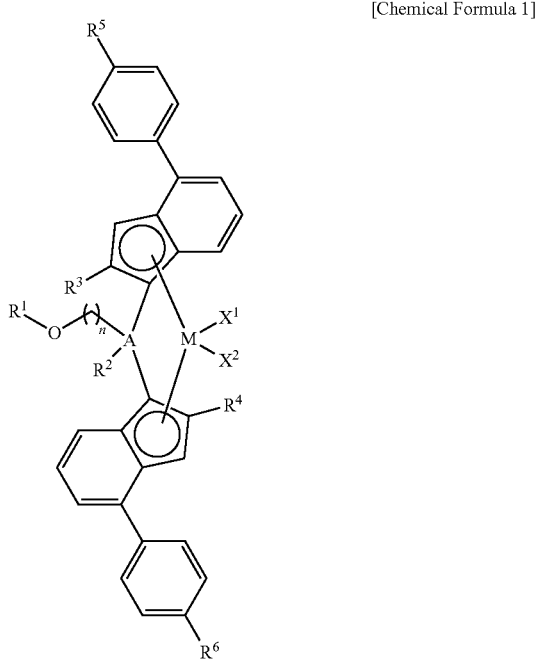

[Chemical Formula 1]

in Chemical Formula 1,

M is one of a Group 3 transition metal, a Group 4 transition metal, a Group 5 transition metal, a lanthanide series transition metal, and an actinide series transition metal, $X^1$ and $X^2$ are the same as or different from each other, and are each independently one of halogen, A is one of Group 14 elements, n is an integer between 1 and 20, $R_1$ is one of an alkyl having 1 to 20 carbon atoms, an alkenyl having 2 to 20 carbon atoms, an alkylaryl having 7 to 30 carbon atoms, an arylalkyl having 7 to 30 carbon atoms, and an aryl having 6 to 30 carbon atoms, $R_2$ is one of hydrogen, an alkyl having 1 to 20 carbon atoms, an alkenyl having 2 to 20 carbon atoms, an alkylaryl having 7 to 30 carbon atoms, an arylalkyl having 7 to 30 carbon atoms, and an aryl having 6 to 30 carbon atoms, and $R_3$ to $R_6$ are each independently one of an alkyl having 1 to 20 carbon atoms, $$R^8-[Al(R^7)-O]_m-R^9$$ [Chemical Formula 2]

in Chemical Formula 2, $R^7$, $R^8$ and $R^9$ are each independently one of hydrogen, halogen, a hydrocarbyl group having 1 to 20 carbon atoms and a hydrocarbyl group having 1 to 20 carbon atoms substituted with halogen, and m is an integer of 2 or more, $$[L-H]^+[W(J)_4]^- \text{ or } [L]^+[W(J)_4]^-$$ [Chemical Formula 3]

wherein, L is a neutral or cationic Lewis base,

W is a Group 13 element, J is each independently a hydrocarbyl group having 1 to 20 carbon atoms; a hydrocarbyloxy group having 1 to 20 carbon atoms; and substituents in which at least one hydrogen atom of the above substituent groups is substituted with at least one substituent selected from halogen, a hydrocarbyloxy group having 1 to 20 carbon atoms and a hydrocarbyl(oxy)silyl group having 1 to 20 carbon atoms.

2. The method for preparing a long fiber-reinforcing olefin polymer according to claim 1, wherein the supported catalyst is a catalyst in which a cocatalyst of Chemical Formula 2, a transition metal compound of Chemical Formula 1, a cocatalyst of Chemical Formula 3 are sequentially supported on a carrier.

3. The method for preparing a long fiber-reinforcing olefin polymer according to claim 1, wherein a catalyst including a transition metal compound in which $R^3$ and $R^4$ in Chemical Formula 1 are each independently one of a linear alkyl having 1 to 3 carbon atoms is used.

4. The method for preparing a long fiber-reinforcing olefin polymer according to claim 1, wherein a catalyst including a transition metal compound in which $R^5$ and $R^6$ in Chemical Formula 1 are each independently one of a branched alkyl having 3 to 6 carbon atoms.

5. The method for preparing a long fiber-reinforcing olefin polymer according to claim 1, wherein a catalyst including a transition metal compound in which $R^1$ in Chemical Formula 1 is one of a branched chain alkyl having 3 to 6 carbon atoms and n is an integer between 3 and 9 is used.

6. The method for preparing a long fiber-reinforcing olefin polymer according to claim 1, wherein a catalyst including a transition metal compound in which $R^2$ in Chemical Formula 1 is one of a linear alkyl having 1 to 3 carbon atoms is used.

7. The method for preparing a long fiber-reinforcing olefin polymer according to claim 1, wherein a catalyst which M in Chemical Formula 1 is one of Group 4 transition metals is used.

8. The method for preparing a long fiber-reinforcing olefin polymer according to claim 1, wherein silica, alumina, magnesia, or a mixture thereof is used as the carrier.

9. The method for preparing a long fiber-reinforcing olefin polymer according to claim 1, wherein the olefin monomer includes at least one selected from the group consisting of ethylene, propylene, 1-butene, 1-pentene 4-methyl-1-pentene, 1-hexene, 1-heptene, 1-octene, 1-decene, 1-undecene, 1-dodecene, 1-tetradecene, 1-hexadecene, 1-eicocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene.

10. The method for preparing a long fiber-reinforcing olefin polymer according to claim 1, wherein the olefin monomer is propylene.

11. The method for preparing a long fiber-reinforcing olefin polymer according to claim 1, wherein an olefin polymer having a weight average molecular weight of 100,000 to 500,000 g/mol is provided.

12. The method for preparing a long fiber-reinforcing olefin polymer according to claim 1, wherein an olefin polymer having a degree of stereoregularity of 95% by weight or more is provided.

13. A long fiber comprising the olefin monomer prepared according to the preparation method of claim 1.

14. The long fiber according to claim 13, further comprising at least one reinforced fiber selected from the group consisting of an organic fiber, a natural fiber, a regenerated fiber, a semi-synthetic fiber, a synthetic fiber, a pitch-based carbon fiber, an aramid fiber and a boron fiber.

15. The long fiber according to claim 14, wherein the at least one reinforced fiber is contained in an amount of 5 to 50 parts by weight based on 100 parts by weight of the olefin polymer.

16. The long fiber according to claim 13, wherein the long fiber has a tensile strength of 975 to 1,000 $kgf/cm^2$.

17. The long fiber according to claim 13, wherein the long fiber has a flexural strength of 1,320 to 1,400 $kgf/cm^2$.

18. The long fiber according to claim 13, wherein the long fiber has an impact strength of 28.0 to 30 kgf*cm/cm.

* * * * *